United States Patent
Gubelmann et al.

(10) Patent No.: US 10,363,680 B2
(45) Date of Patent: Jul. 30, 2019

(54) SUPPORT REMOVAL TOOL FOR ADDITIVE MANUFACTURE

(71) Applicant: General Electric Company, Schenectady, NY (US)

(72) Inventors: Fabian Gubelmann, Buchs (CH); Dariusz Oliwiusz Palys, Gebenstorf (CH); Ernst Vogt, Remigen (CH)

(73) Assignee: General Electric Company, Schenectady, NY (US)

( * ) Notice: Subject to any disclaimer, the term of this patent is extended or adjusted under 35 U.S.C. 154(b) by 81 days.

(21) Appl. No.: 15/263,998

(22) Filed: Sep. 13, 2016

(65) Prior Publication Data

US 2018/0071824 A1    Mar. 15, 2018

(51) Int. Cl.
| | |
|---|---|
| *B26F 3/00* | (2006.01) |
| *B33Y 40/00* | (2015.01) |
| *B22F 3/24* | (2006.01) |
| *B33Y 80/00* | (2015.01) |
| *B22F 5/00* | (2006.01) |

(52) U.S. Cl.
CPC .............. *B26F 3/00* (2013.01); *B22F 3/24* (2013.01); *B22F 5/00* (2013.01); *B33Y 40/00* (2014.12); *B33Y 80/00* (2014.12); *B22F 2003/247* (2013.01); *B22F 2999/00* (2013.01); *Y02P 10/295* (2015.11)

(58) Field of Classification Search
CPC ...... Y10T 225/30; Y10T 225/298; B22F 3/24; B22F 5/00; B22F 2003/247; B22F 2999/00; B22F 2005/002; B33Y 40/00; B33Y 80/00; B22D 31/00; F26F 3/00
See application file for complete search history.

(56) References Cited

U.S. PATENT DOCUMENTS

| | | |
|---|---|---|
| 3,122,038 A | 2/1964 | Juras |
| 3,724,305 A | 4/1973 | Kondo |
| 6,508,155 B1 | 1/2003 | Phlipot |
| 9,283,716 B2 | 3/2016 | Swanson et al. |
| 2011/0227246 A1 | 9/2011 | Hangai et al. |
| 2015/0258609 A1 | 9/2015 | Teulet |
| 2016/0082694 A1 | 3/2016 | Griess et al. |
| 2016/0175932 A1 | 6/2016 | Dimter et al. |

FOREIGN PATENT DOCUMENTS

| | | |
|---|---|---|
| DE | 10 2009 027 996 A1 | 1/2011 |
| GB | 2 148 762 A | 6/1985 |
| JP | H10-291067 A | 11/1998 |

OTHER PUBLICATIONS

Extended European Search Report and Opinion issued in connection with corresponding EP Application No. 17189562.6 dated Feb. 2, 2018.

*Primary Examiner* — Phong H Nguyen
(74) *Attorney, Agent, or Firm* — Dale Davis; Hoffman Warnick LLC

(57) ABSTRACT

Aspects of the disclosure include a machine and system for support removal and a laser-sintered component compatible with same. A laser-sintered component may have a component surface and at least one laser-sintered support extending from the component surface. A press may move a cutting surface along a cutting path adjacent to the component surface. The cutting surface has a shape complementary to the component surface and at least one cutting edge positioned to separate at least one laser-sintered support from the component surface as the cutting surface moves along the cutting path.

9 Claims, 5 Drawing Sheets

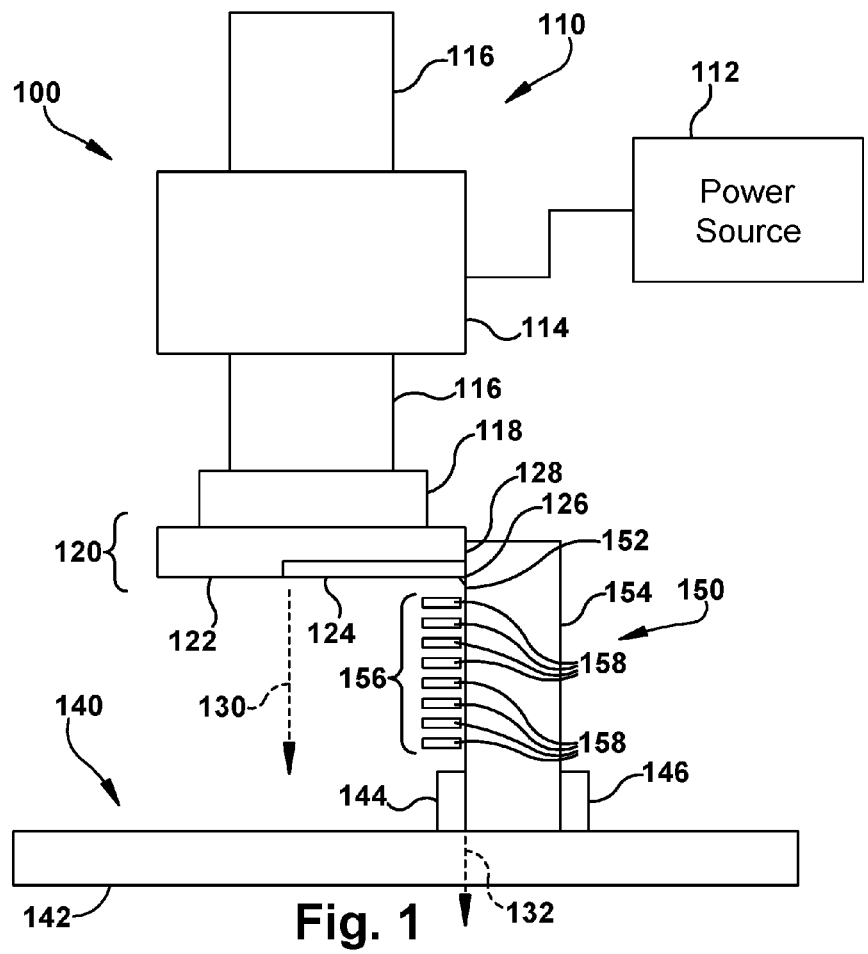
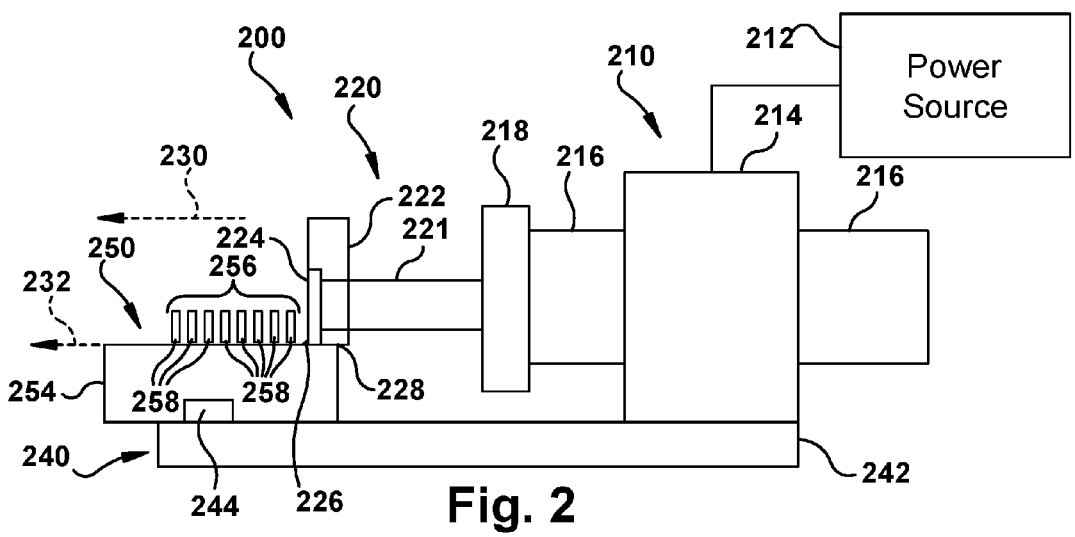

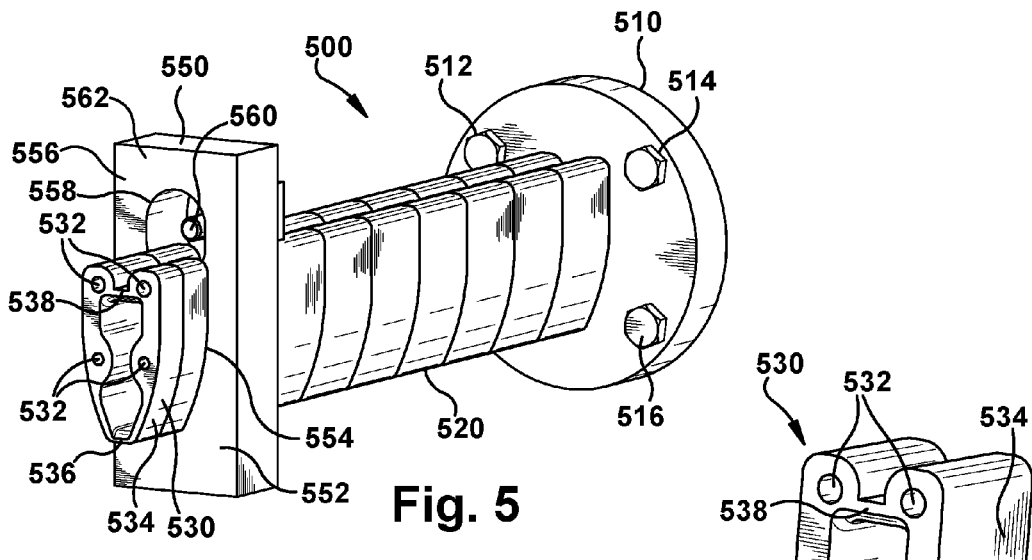
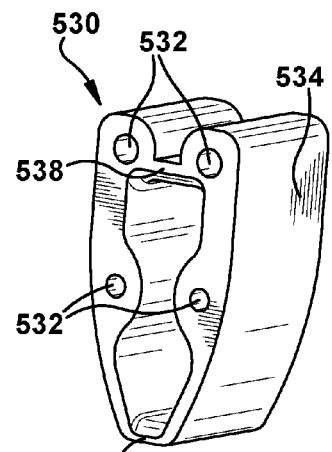
Fig. 6
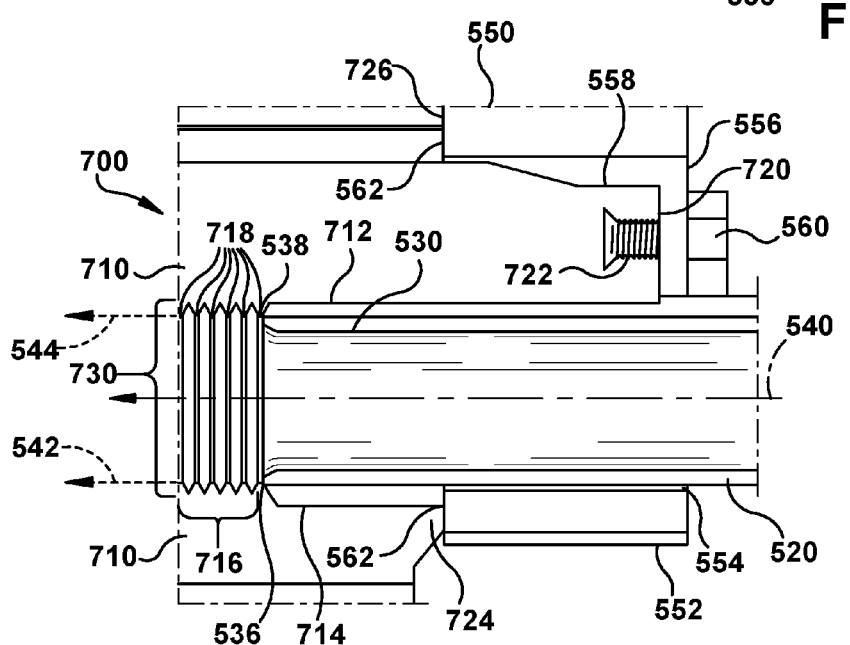
Fig. 7

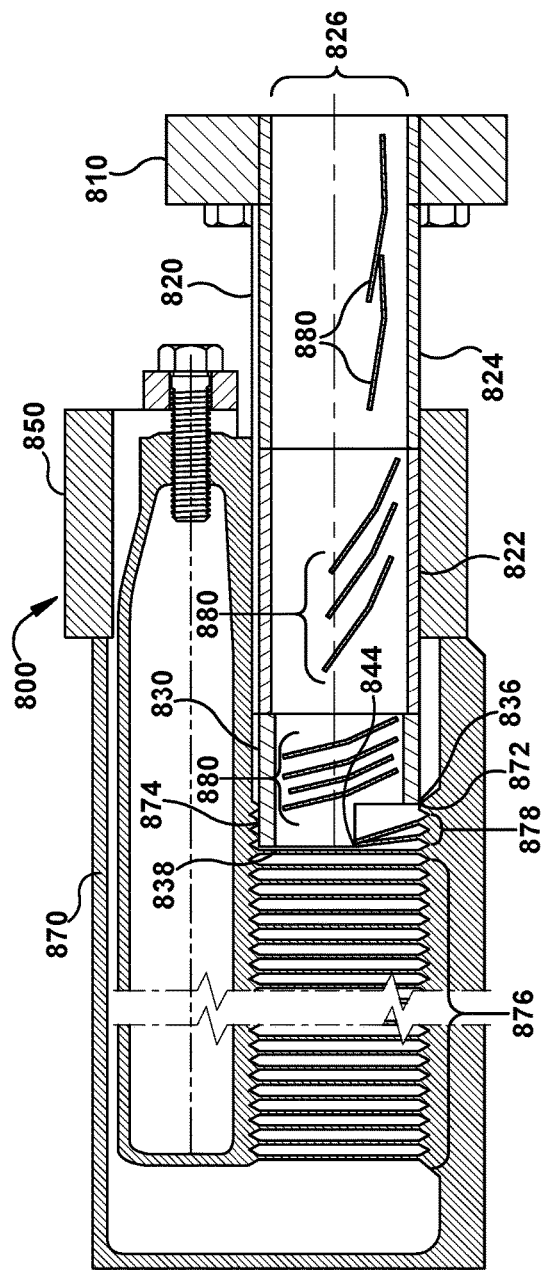
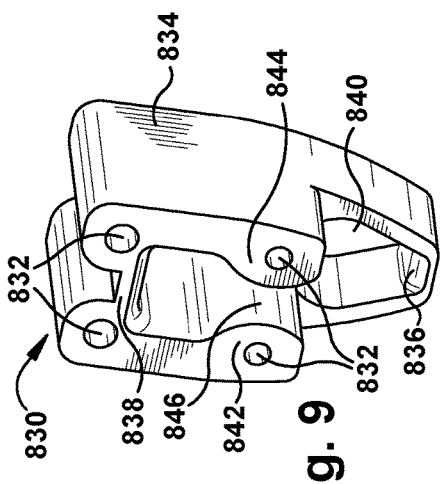

SUPPORT REMOVAL TOOL FOR ADDITIVE MANUFACTURE

TECHNICAL FIELD

The disclosure relates generally to the removal of supports from laser-sintered components, such as those produced in additive manufacture. More particularly, embodiments of the present disclosure provide machines, tooling attachments, and components for removing support structures with a press machine.

BACKGROUND

The pace of change and improvement in the realms of power generation, aviation, and other fields has accompanied extensive research for manufacturing components used in these fields. Conventional manufacture of metallic components generally includes milling or cutting away regions from a slab of metal before treating and modifying the cut metal to yield a part, which may have been simulated using computer models and computer aided design. Manufactured components which may be formed from metal include airfoil components for installation in a turbomachine such as an aircraft engine or power generation system, as well as mechanical components for other manufacturing, transportation, and structural systems.

The development of additive manufacturing, also known in the art as "3D printing," can reduce manufacturing costs by allowing such components to be formed more quickly, with unit-to-unit variations as appropriate. Among other advantages, additive manufacture can directly apply computer-generated models to a manufacturing process while relying on less expensive equipment and/or raw materials.

Additive manufacturing can allow a component to be formed from a reserve of fine metal powder positioned on a build plate, which is processed by an electron beam or laser (using heat treatments such as sintering) to form a component or sub-component. Additive manufacturing equipment can also form components by using three-dimensional models generated with software included within and/or external to the manufacturing equipment. Some devices fabricated via additive manufacture can be formed initially as several distinct components at respective processing stages before being assembled in a subsequent process. One challenge associated with additive manufacturing includes maintaining the shape of a component before the manufacturing process completes. For example, some portions of a component may be structurally stable after the component has been manufactured, but may need additional structural support when some parts have not been built. Some designs may address this concern by including temporary supports which may be designed and positioned for removal after the component is manufactured. Due to variances between manufactured components and the manner in which these components are formed, the use of these supports can vary widely between component designs. The supports may also be manufactured such that they are capable of being removed only after the component is fully manufactured.

SUMMARY

A first aspect of the disclosure provides a machine for support removal. A press member is controllably movable along a path adjacent a component surface of a laser-sintered component. A cutting surface is moveable by the press member along a cutting path and has a shape complementary to the component surface. The cutting surface also has at least one cutting edge positioned to separate at least one laser-sintered support from the component surface as the cutting surface moves along the cutting path.

A second aspect of the disclosure provides a support removal system for use with a press machine. The system includes an interface connector for a press machine, a laser-sintered component, and a cutting surface. The laser-sintered component has a component surface with a component surface shape and at least one laser-sintered support extending from the component surface. The cutting surface is positioned relative to the interface connector and controllably moveable by the press machine along a cutting path adjacent to the component surface. The cutting surface has a cutting surface shape complementary to the component surface shape and at least one cutting edge positioned to separate at least one laser-sintered support from the component surface as the cutting surface moves along the cutting path.

A third aspect of the invention provides a laser-sintered component. The laser-sintered component has a component surface with a component surface shape and at least one laser-sintered support extending from the component surface. The laser-sintered support has a breakable joint adjacent the component surface. The laser-sintered component also includes a mounting receptacle detachably receiving a guide for a cutting surface. The cutting surface is controllably moveable by a press machine along a cutting path adjacent to the component surface. The cutting surface has a cutting surface shape complementary to the component surface shape and at least one cutting edge positioned to separate the at least one laser-sintered support from the component surface as the cutting surface moves along the cutting path.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 1 provides a block diagram of an example support removal tool and laser-sintered component.

FIG. 2 provides a block diagram of another example support removal tool and laser-sintered component.

FIG. 5 provides a side perspective view of an example support removal tool for a press machine.

FIG. 6 provides a perspective view of a cutting head for the example support removal tool of FIG. 5.

FIG. 7 provides a cutaway view of a portion of the example support removal tool of FIG. 5 and a portion of a laser-sintered component.

FIG. 8 provides a cutaway view of another example support removal tool for a press machine and a laser-sintered component.

FIG. 9 provides a perspective view of a cutting head for the example support removal tool of FIG. 8.

Figure 3:
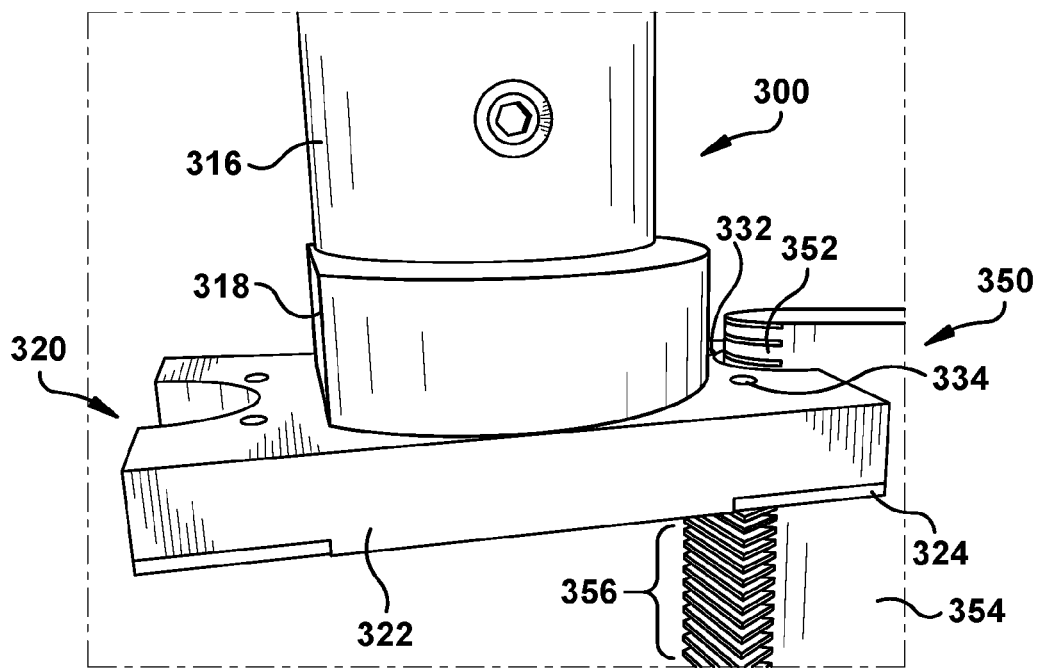
FIG. 3 provides a front perspective view of a portion of an example support removal tool and laser-sintered component.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

FIG. 1 shows an example support removal tool 100 and laser-sintered component 150 positioned for support removal. Tool 100 may include a press machine 110 operably connected to a power source 112. Press machine 110 may include a body 114 and a movable press member 116 (visible on both sides of body 114). A wide variety of press machines are commercially available using various motive powers and control systems for controllably moving the press member with desired position, speed, and/or force. For example, a computer-controlled hydraulic press may enable a user to monitor and control the position, speed, and force of a hydraulic press member. In the example shown, a vertical press machine is shown, but other orientations are possible (see e.g., FIG. 2). Press machine 110 may also include a mounting interface 118, such as a slide plate, for removably engaging various tooling, whereby a general purpose press machine may be configured for a variety of tasks. Interface 118 may include a variety of receivers or connectors for engaging the interface end of various tooling, such as threaded fittings, through holes, retention slots, chucks, or other mechanical connectors or portions thereof.

Press machine 110 may engage, directly engage, or further comprise a tooling fixture 120 for support removal. Fixture 120 may be attached to interface 118 such that press machine 110 via press member 116 controls the position, speed, and/or force of fixture 120. In the example shown, example fixture 120 includes a cutting head 122 with a removable cutting plate 124 that includes a cutting edge 126. Cutting head 122, cutting plate 124, and cutting edge 126 all define a cutting surface 128 adjacent a complementary component surface 152 of the component 150. In the example shown, press member 116 and, therefore, fixture 120 follow a press path 130 defined by operation of press machine 110. At least a portion of component surface 152 and cutting surface 128 are complementary in a direction parallel to press path 130. For example, if component surface 152 is a flat plane in both the direction of press path 130 and a perpendicular direction defining a planar surface, cutting surface 128 would also be a planar surface. If component surface 152 is an arcuate surface, cutting surface 128 would be a complementary arc such that cutting edge 126 is maintained adjacent component surface 152 as it travels along press path 130. The path traveled by cutting edge 126 may be referred to as a cutting path 132 and follows the component surface 152. In one embodiment, cutting edge 126 is an angled portion of cutting plate 124. Cutting plate 124 may be removably attached to cutting head 122 such that it can be removed and sharpened or replaced as cutting edge 126 wears.

In some embodiments, press machine 110 may engage, directly engage (via a press machine frame—not shown), or further comprise a mounting stage 140 for supporting and positioning component 150. Mounting stage 140 includes a base plate 142 and one or more mounts 144, 146 for positioning, engaging, and retaining component 150 during support removal. For example, mounts 144, 146 may include pressure mounts, one or more fasteners (or portions thereof) compatible with mechanical features of component 150, or other mounts used to secure a component in a working position within a machine.

Component 150 is a mechanical component formed, at least in part, by additive manufacture, such as laser-sintering. Component 150 may form part of, or may be adaptable to form part of, a larger component and/or machine such as a power generation assembly. It will be understood, however, that component 150 may have applications other than those described by example herein. Component 150 defines component surface 152 on a component body 154 with a plurality of laser-sintered supports 156 projecting from component surface 152. Supports 156 are made by additive manufacturing, such as laser-sintering, and may be made by the same additive manufacturing process that produces component body 154 or other features of component 150. Supports 156 are intended for removal and may be manufactured to be less strong than other portions of component 150, particularly to a force exerted along component surface 152. In some embodiment, supports 156 include a breakpoint, such as an area of thinner material (e.g., notch, taper, or chamfered on one or both sides) or otherwise weakened area (e.g., voids, different sintering process, or materials). For example, supports 156 include breakable joints 148 where the thickness of supports 156 is reduced in the direction of cutting path 132 and adjacent where cutting edge 126 will contact each of supports 156. Component surface 152 can define a substantially rounded geometry (e.g., circular, ovular, etc.), or alternatively can form other geometries such as a triangular, quadrilateral, and/or other multi-sided geometry. Cutting surface 128 may have a similarly complex surface shape, at least along the portion of component surface 152 that includes supports in need or removal. In addition to exterior surfaces, component 150 may include interior surfaces and supports that may be removed by support removal tool 100 as further described below. The build direction of component 150 may determine the need for and location of supports 156. In additive manufacture, a "build direction" of one or more components may be defined by a fabricator before raw materials are processed from raw materials into a desired structure. A build direction for a given component and/or sub-component therefore defines the order in which structural features are formed over time as raw materials (e.g., metallic powders) are sintered to form a structure. Such materials can include, e.g., one or more pure metals and/or alloys including without limitation: Copper (Cu), Chromium (Cr), Titanium (Ti), Nickel (Ni), aluminum (Al), etc. Note that the build direction and component orientation during manufacture may not have any bearing on the positioning of component 150 in tool 100 for support removal.

FIG. 2 shows an alternative example support removal tool 200 and laser-sintered component 250 positioned for support removal. Tool 200 may be designed and operate similarly to tool 100 described above, but with a horizontal press orientation, rather than a vertical one. For brevity, similar components in tool 200 should be considered as described above unless noted otherwise. Tool 200 may include a press machine 210 operably connected to a power source 212 and including a body 214 and a movable press member 216 (visible on both sides of body 214). Press machine 210 may also include a mounting interface 218, such as a slide plate, for removably engaging various tooling, whereby a general purpose press machine may be configured for a variety of tasks.

Press machine 210 may engage, directly engage, or further comprise a tooling fixture 220 for support removal. Fixture 220 may be attached to interface 218 such that press machine 210 via press member 216 controls the position, speed, and/or force of fixture 220. In the example shown, example fixture 220 includes an extension member 221, a cutting head 222 with a removable cutting plate 224 that includes a cutting edge 226. Extension member 221 extends from mounting interface 218 and positions cutting head 222 away from press member 216 to assist with positioning the cutting head 222 relative to component 250. In some embodiments, extension member 221 positions the cutting head 222 adjacent component surface 252 while preventing interference between press machine 210 and component 250. In some embodiments, extension member 221 may enable cutting head 222 to reach interior component surfaces or other difficult to reach surface areas. Cutting head 222, cutting plate 224, and cutting edge 226 all define a cutting surface 228 adjacent a complementary component surface 252 of the component 250. In the example shown, press member 216 and, therefore, fixture 220 follow a press path 230 defined by operation of press machine 210. The path traveled by cutting edge 226 may be referred to as a cutting path 232 and follows the component surface 252.

In some embodiments, press machine 210 may engage, directly engage (via a press machine frame—not shown), or further comprise a mounting stage 240 for supporting and positioning component 250. Mounting stage 240 includes a base plate 242 and one or more mounts 244 for positioning, engaging, and retaining component 250 during support removal.

Component 250 is a mechanical component formed, at least in part, by additive manufacture, such as laser-sintering. Component 250 defines component surface 252 on a component body 254 with a plurality of laser-sintered supports 256 projecting from component surface 252. In some embodiment, supports 256 include a breakpoint, such as an area of thinner material (e.g., notch, taper, or chamfered on one or both sides) or otherwise weakened area (e.g., voids, different sintering process, or materials). For example, supports 256 include breakable joints 248, where the thickness of supports 256 is reduced in the direction of cutting path 232 and adjacent where cutting edge 226 will contact and separate each of supports 256.

Figure 4:
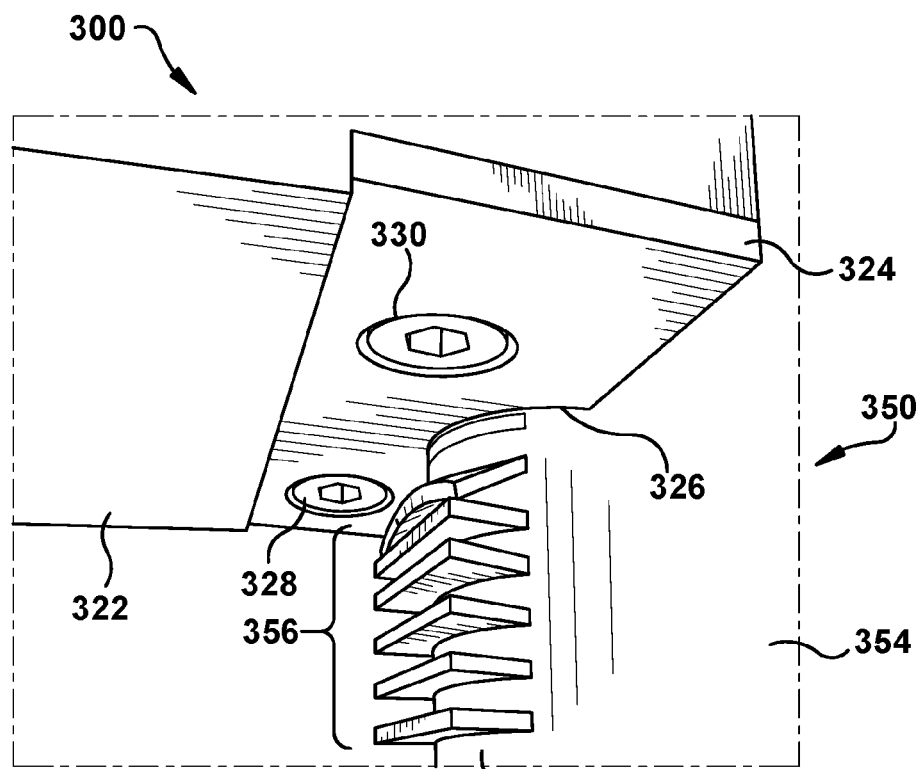
FIG. 4 provides a bottom perspective view of a portion of the example support removal tool and laser-sintered component of FIG. 3.

FIG. 3 and FIG. 4 show a portion of an example support removal tool 300 and laser-sintered component 350. In the example shown, a press member 316 and a mounting interface 318 from a press machine support a tooling fixture 320. In the example shown, fixture 320 includes a cutting head 322 with a removable cutting plate 324 that includes a cutting edge 326. Cutting edge 326 is arcuate to complement the curve of component surface 352 along the portion that includes supports 356. Note that cutting edge 326 is only a portion of cutting head 322 and cutting plate 324 that is shaped and positioned to engage the area of component surface 352 where supports 356 are located. As shown, cutting plate 324 is removably attached to cutting head 322 using fasteners 328, 330 through receiving holes 332, 334 defined in cutting head 322.

As stated above, some laser-sintered components may include interior spaces with supports for removal, including supports that span the interior space and have multiple attachment points with the body of the component. In order to remove interior supports, a support removal tool may include a cutting head and extension member shaped and sized to position the cutting edge on one or more interior component surfaces. For example, a component can have a shaped hollow interior containing one or more supports. In some embodiments, these supports may be interconnected such that they comprise a support package that may be removed as a unit once the individual supports are cut from the body of the component. The dislodged individual supports and/or support package can then be removed from the component by any conventional means for removing waste material(s) from the interior of a structure.

FIG. 5, FIG. 6, and FIG. 7 show an example support removal fixture 500 for a press machine, such as the press machines shown and described above with regard to FIG. 1 and FIG. 2. Fixture 500 may be used to remove supports from an interior space of a component. For example, in FIG. 7, a portion of a laser-sintered component 700 is shown with a component body 710 defining opposed interior surfaces 712, 714 and having a plurality of supports 716 extending from the opposed interior surfaces 712, 714 and having breakable joints 718 proximate the interior surfaces 712, 714. In the example shown, component 700 also incorporates a mounting feature 720 for securing component 700 to the fixture 500, such as defining a threaded opening 722 for receiving a threaded fastener. In some embodiments, component 700 may include one or more stopping interfaces 724, 726 as part of mounting feature 720.

Fixture 500 may include a machine interface 510, such as a tool interface plate, that may be removably attached to a tool mounting interface of a press machine. In the example shown, machine interface 510 includes a plurality of fasteners 512, 514, 516 for attaching to a compatible feature of the mounting interface. For example, machine interface 510 may define a plurality of through holes that correspond to threaded receiving holes in the tool mounting interface of the press machine and the plurality of fasteners 512 may be bolts inserted through the through holes and tightened into the threaded receiving holes. Alternate fasteners may include clamps, dovetails, chucks, and other mechanical attachment hardware.

Fixture 500 may further include an extension member 520 extending from machine interface 510 and having a cross-section and length for reaching the surface or surfaces from which supports need to be removed. In the example shown, extension member 520 includes a plurality of sections attached to one another to achieve a member of the desired length. For example, each section may include a plurality of through-holes and the sections are mounted via the through holes on rods extending from machine interface 510. Extension member 520 may be reconfigured or replaced for various component configurations, enabling different lengths and cross-sections for reaching different component surfaces. In some embodiments, extension member 520 may comprise a single section of desired length and a plurality of such members may be provided and interchanged for reaching different surfaces based on component configuration. In the example shown, the cross-section of extension member 520 is the same as the cross-section of cutting head 530 and cutting head 530 is attached directly to extension member 520 using a similar attachment method to those between the sections of extension member 520. For example, cutting head 530 may define a plurality of attachment holes 532, such as threaded through holes for receiving the threaded ends of rods extending through extension member 520.

Cutting head 530 has a cross-sectional shape defining lateral exterior surface 534 that may assist in positioning cutting head 530 relative to supports 716 in component 700. Some or all of exterior surface 534 may define a cutting surface that travels along a press path 540 adjacent to one or more surfaces of component 700. For example, exterior surface 534 may travel adjacent to opposed interior surfaces 712, 714, as well as lateral interior surfaces (not shown) defining the interior space of component 700. Cutting head 530 may include one or more cutting edges 536, 538 positioned to separate supports 716 from interior surfaces 712, 714. For example, cutting head 530 includes a first (lower) cutting edge 536 for cutting the bottom of supports 716 and a second (upper) cutting edge 538 for cutting the top of supports 716. First cutting edge 536 follows a first cutting path 542 and second cutting edge 438 follows a second cutting path to separate supports 716 from component body 710. Any number of cutting edges may be incorporated in cutting head 530, depending on the number and placement of attachment points between the supports and the component surfaces from which they extend. Cutting head 530 and extension member 520 may also define an internal space for receiving separated supports, as described below with regard to FIG. 8 and FIG. 9.

Fixture 500 may also include a component interface 550 for engaging component 700 and maintaining the relative position between component 700 and cutting head 530 as it moves along press path 540. Component interface 550 may include a guiding plate 552 defining a guide opening 554 through which cutting head 530 and extension member 520 pass along press path 540 and into interior space 730 of component 700. Component interface 550 may also include a fixing plate 556 for engaging mounting feature 720 of component 700 to position and retain component 700. In the example shown, the fixing plate 556 defines an opening 558 for receiving an exterior portion of mounting feature 720 and a fastener 560 for securing the mounting feature 720 in the opening. For example, fastener 560 may be a threaded bolt that may be tightened into threaded opening 722 to secure component 700 to component interface 550. Component interface 550 may also include a stopping surface 562 against which stopping interfaces 724, 726 engage when component 700 is positioned against fixture 500.

FIG. 8 and FIG. 9 show another example support removal fixture 800 that operates similar to fixture 500 above, but with a different cutting head configuration. Fixture 800 may use a similar machine interface 810 to machine interface 510 for engaging with a press machine and a similar component interface 850 to component interface 550 for engaging with laser-sintered component 870. Extension member 820 may be similar extension member 520 and composed of a plurality of sections 822, 824 for reaching opposed internal surfaces 872, 874 of component 870. In addition to the reach and positioning features of extension member 520, extension member 820 defines an interior space 826 for receiving separated supports 880. In the example shown, sections 822, 824 define a continuous space from cutting head 830 through machine interface 810, whereby separated supports 880 may be collected and removed from the internal space of component 870.

Similar to cutting head 530, cutting head 830 may define a plurality of attachment holes 832 and have a cross-sectional shape defining lateral exterior surface 834 that may assist in positioning cutting head 830 relative to supports 876 in component 870. In the example shown, cutting head 830 has a lower cutting edge 836 and an upper cutting edge 838. Lower cutting edge 836 is recessed from upper cutting edge 838 in the direction of the press path such that upper cutting edge 838 contacts supports 876 before lower cutting edge 836. Upper cutting edge 838 cuts an upper attachment between supports 876 and interior surface 874 and lower cutting edge 836 cuts a lower attachment between supports 876 and interior surface 872, such that the cutting edges 836, 838 engage with each support sequentially, rather than simultaneously. In some embodiments, cutting head 830 further defines an internal channel 840 receiving separated supports 880. Internal channel 840 may be continuous with interior space 826 to form a support removal channel from cutting head 830 through machine interface 810. In some embodiments, cutting head 830 may include support facing surfaces 842, 844 that may contact supports 876 as they are cut by upper cutting edge 838. As partially separated supports 878 are bent, they are guided by guide surface 844 (and unseparated supports forward in the press path) toward internal channel 840. When lower cutting edge 836 fully separates supports, they are collected in internal channel 840.

Figure 10:
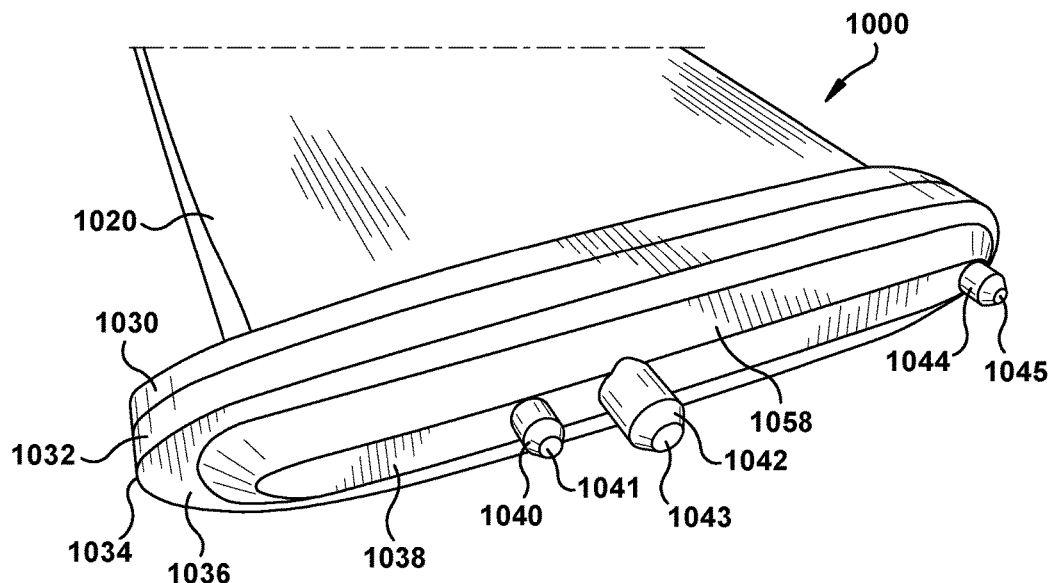
FIG. 10 provides a perspective view of a portion of an example support removal tool with pre-deforming extensions.
Figure 11:
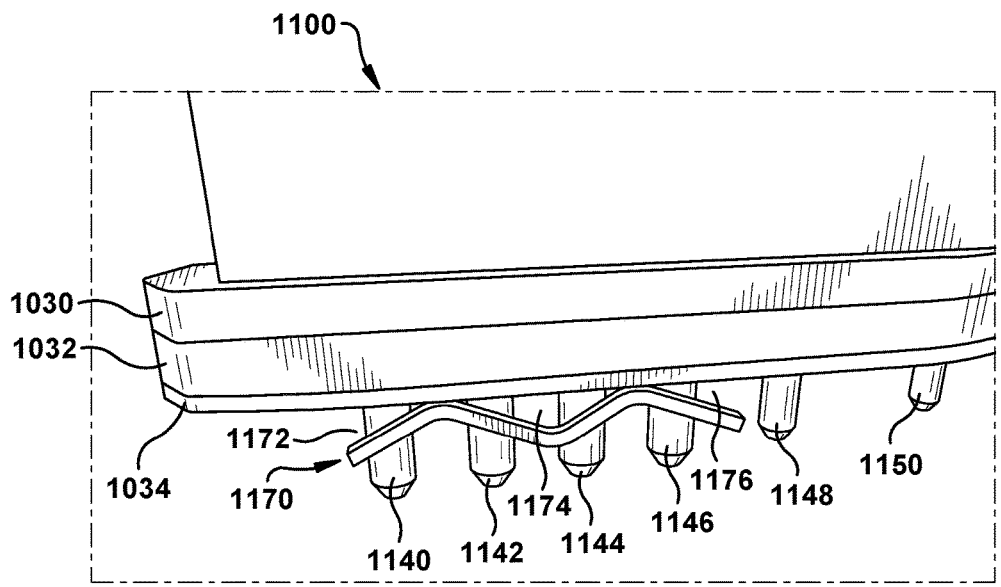
FIG. 11 provides a perspective view of a portion of an example support removal tool with support capture pins and a separated laser-sintered support.

FIG. 10 and FIG. 11 show alternative example configurations of cutting heads for use in a support removal tool, such as those described above. In FIG. 10, a portion of a support removal tool 1000 is shown, including an extension member 1020 and a cutting head 1030. Cutting head 1030 may include a removable cutting plate 1032 with a cutting edge 1034. In the example shown, cutting edge 1034 includes the circumference of the leading edges of cutting plate 1032 where it would engage with the internal surfaces of a laser-sintered component with an internal cavity with a complementary surface. Cutting head 1030 may further include a number of deforming surfaces. A deforming plate 1038 extends from a leading surface 1036 of cutting plate 1032. In the example shown, deforming plate 1038 provides a beveled surface extending substantially along the leading surface 1036 that would contact the supports of a component before cutting edge 1034. Deforming plate 1038 places a bending stress on the supports in a relatively uniform pattern across the support to weaken the breakable joints prior to contact with cutting edge 1034. In the example shown, deforming plate 1038 further comprises support capture pins 1040, 1042, 1044 that are calculated to extend through specific locations on the support.

In FIG. 11, a portion of a support removal tool 1100 is shown, including an extension member 1120 and a cutting head 1130. Cutting head 1130 is structurally similar to cutting head 1030, with a support plate 1132 and a cutting edge 1134. In the embodiment shown, there are a plurality of support capture pins 1140, 1142, 1144, 1146, 1148, 1150 extending through openings 1172, 1174, 1176 of support 1170 to capture and retain support 1170 after it is separated from the component. Where deforming plates and pre-deforming pins are positioned to contact and exert bending force on supports prior to and/or during support removal, support capture pins 1140, 1142, 1144, 1146, 1148, 1150 align with openings 1172, 1174, 1176 and extend through them prior to the support being separated by cutting edge 1134. Thus, when support 1170 is separated from the component surfaces, it is retained on support capture pins 1140, 1142, 1144, 1146, 1148, 1150 for removal.

The above-described components, supports, and parts thereof can be manufactured using any now known or later developed technologies, e.g., machining, casting, etc. In one embodiment, however, additive manufacturing is particularly suited for manufacturing the components described above. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of metal, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) and direct metal laser melting (DMLM). In the current setting, DMLM has been found advantageous.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A machine system comprising:
   a press machine having a press member controllably movable along a path adjacent a component surface of a laser-sintered component;
   a cutting surface moveable by the press member along a cutting path and having a cutting surface shape complementary to a component surface shape of the component surface, the cutting surface having at least one cutting edge positioned to separate at least one laser-sintered support from the component surface as the cutting surface moves along the cutting path; and
   at least one pin projecting forward from the cutting surface along the cutting path and aligned with an opening defined by the at least one laser-sintered support, whereby the at least one pin extends through the opening prior to the cutting surface separating the at least one laser-sintered support.

2. The machine system of claim 1, wherein the at least one laser-sintered support includes a plurality of supports extending from the component surface, and wherein the cutting path directs the cutting surface along the component surface to separate each of the plurality of supports from the component surface.

3. The machine system of claim 1, further comprising a removable cutting plate removably connected to the press member, wherein the cutting surface comprises an angled edge of the removable cutting plate that aligns with a breakable joint of the at least one laser sintered support.

4. The machine system of claim 1, wherein the laser-sintered component has at least one interior sidewall defining the component surface and wherein the machine further comprises an extension member extending from the press member and supporting the cutting surface, the extension member positioning the cutting surface adjacent the at least one interior side wall to separate the at least one laser-sintered support from the component surface along the cutting path.

5. The machine system of claim 1, wherein the laser-sintered component has opposing interior sidewalls, the opposing interior sidewalls defining a hollow interior of the laser-sintered component with a plurality of laser-sintered supports extending between the opposing interior side walls, and wherein the cutting surface comprises a first cutting edge positioned adjacent a first of the opposing interior side walls and a second cutting edge positioned adjacent a second of the opposing interior side walls.

6. The machine system of claim 1, further comprising a guide removably connected to the laser-sintered component and defining an opening through which the cutting surface passes along the cutting path prior to engaging the component surface and separating the at least one laser-sintered support.

7. The machine system of claim 1, further comprising an extension member extending from the press member and supporting the cutting surface, the extension member positioning the cutting surface adjacent the component surface to separate the at least one laser-sintered support from the component surface along the cutting path, wherein the extension member comprises a body defining a channel for receiving at least one separated laser-sintered support.

8. The machine system of claim 1, wherein the cutting surface comprises a first cutting edge positioned adjacent a first component surface and a second cutting edge positioned adjacent a second component surface, wherein the at least one laser-sintered support extends from the first component surface to the second component surface and the first cutting edge is forward of the second cutting edge along the cutting path.

9. The machine system of claim 1, further comprising at least one deforming surface projecting forward from the cutting surface along the cutting path and aligned to exert a contact force on the at least one laser-sintered support prior to the cutting surface separating the at least one laser-sintered support.

* * * * *